United States Patent [19]

Takahashi

[11] 4,451,079
[45] May 29, 1984

[54] OPERATOR'S CAB IN A CONSTRUCTION VEHICLE

[75] Inventor: Tomoyuki Takahashi, Yawata, Japan

[73] Assignee: Kabushiki Kaisha Komatsu Seisakusho, Tokyo, Japan

[21] Appl. No.: 269,958

[22] Filed: Jun. 3, 1981

[51] Int. Cl.³ .............................................. B62D 27/04
[52] U.S. Cl. .................................. 296/190; 180/89.13
[58] Field of Search ................... 296/190, 35.1, 190; 267/57.1 R, 57.1 A, 63 A; 280/713; 180/89.12–89.16

[56] References Cited

U.S. PATENT DOCUMENTS

| | | | |
|---|---|---|---|
| 3,006,627 | 10/1961 | Paulsen | 267/57.1 R |
| 3,690,720 | 9/1972 | Whisler | 296/190 |
| 3,770,291 | 11/1973 | Kramer | 267/57.1 R |
| 3,847,492 | 11/1974 | Kennicutt et al. | 296/190 |
| 3,948,341 | 4/1976 | Foster | 180/89.15 |
| 3,973,796 | 8/1976 | Suzuki | 296/190 |
| 4,043,584 | 8/1977 | Wagner et al. | 296/35.1 |
| 4,143,903 | 3/1979 | Yoshida et al. | 296/35.1 |
| 4,262,929 | 4/1981 | Pierce | 280/713 |

Primary Examiner—Robert B. Reeves
Assistant Examiner—Dennis Pedder
Attorney, Agent, or Firm—Armstrong, Nikaido, Marmelstein & Kubovcik

[57] ABSTRACT

Operator's cab in a construction vehicle having a body of the operator's cab which is mounted on a chassis frame of the vehicle by the interposition of air spring devices provided between the bottom of the operator's cab body and the chassis frame and connecting mechanism for connecting through resilient members the operator's cab body with the chassis frame. The connecting mechanism comprises first and second coupler levers connected longitudinally and transversely, respectively, between the bottom of the operator's cab body and the chassis frame to restrict and absorb longitudinal and transverse oscillations of the operator's cab body, and/or a third coupler lever connected longitudinally between the top of the operator's cab body and an upstanding gate-shaped frame fixedly mounted on the chassis frame.

4 Claims, 8 Drawing Figures

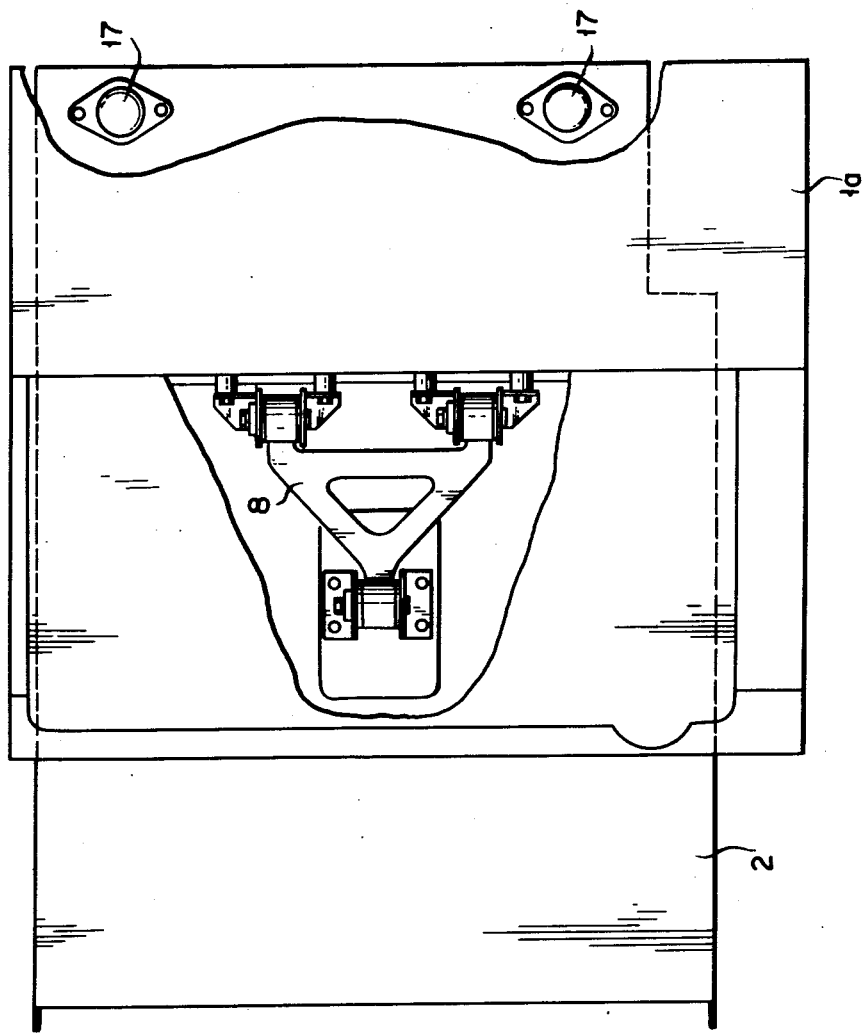

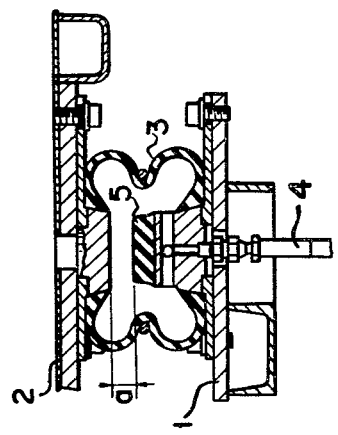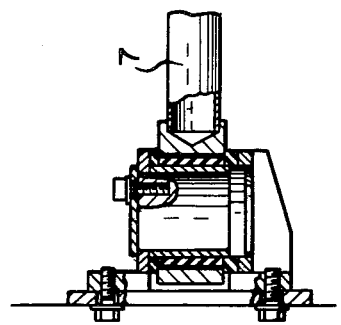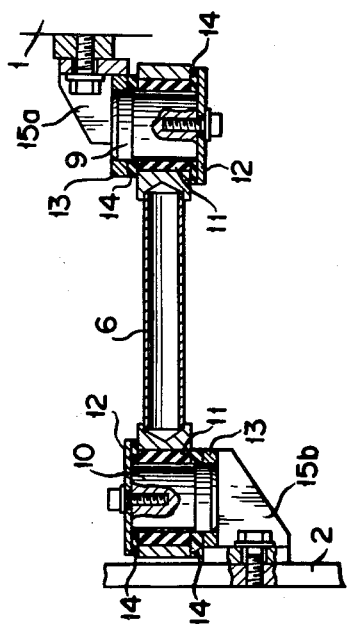

OPERATOR'S CAB IN A CONSTRUCTION VEHICLE

BACKGROUND OF THE INVENTION

The present invention relates to an operator's cab in a construction vehicle.

In a construction vehicle such as a bulldozer, an operator's cab has been directly mounted on the chassis frame of the vehicle with or without cushioning means interposed between the operator's cab and the chassis frame. Accordingly, vibrations and impacts transmitted from the exterior of the vehicle such as, for example, the effects caused by crawling over rough ground surface or caused by the vibrating bodies of the vehicle such as the engine, the pump, the transmission and the torque convertor arranged in the vehicle are applied to the operator's cab. These raise the noise level in the cab and deteriorate the comfortable feeling of the operator in the cab.

In order to avoid the above described difficulties, there have been presented some inventions such as, for example, U.S. Pat. No. 3,973,796 (Yasuo Suzuki) and U.S. Pat. No. 4,143,903 (Shuji Yoshida). U.S. Pat. No. 3,973,796 discloses an operator's cab in a construction vehicle in which the operator's cab is suspended from front and rear upstanding posts fixedly secured to the chassis of the vehicle by the interposition of suspension means. On the other hand, U.S. Pat. No. 4,143,903 discloses a mounting apparatus of a driver's cab for an earth moving vehicle wherein the driver's cab is mounted on a body frame of the vehicle through rubber cushion members. Both the suspension means and the rubber cushion members are relatively complex structures, and moreover cannot bear a remarkably heavy operator's cab.

The present invention has been therefore made in view of the aforesaid circumstances.

SUMMARY OF THE INVENTION

The object of the present invention is to provide an operator's cab mounting in a construction vehicle which can sufficiently bear or suspend a remarkably heavy operator's cab.

Another object of the present invention is to provide an operator's cab mounting in a construction vehicle in which the engine's vibrations, vibrations transmitted from a rough ground surface to the vehicle body during crawling and vibrations transmitted from implements of the vehicle to the vehicle body can be prevented from being transmitted to the operator's cab.

Another object of the present invention is to provide an operator's cab in a construction vehicle which is adapted to be suspended in a stable condition without tilting both in the longitudinal and the transverse directions.

In order to achieve the above objects of the present invention, there is provided an operator's cab in a construction vehicle comprising a body of the operator's cab, air spring devices each provided between the bottom of the operator's cab body and the chassis frame of the vehicle to support in a cushioning manner the operator's cab body on the latter, connecting mechanism for connecting through resilient members the operator's cab body with the chassis frame so as to restrict oscillation of the operator's cab body in the longitudinal and the transverse directions thereof, and damper devices each vertically connected between the bottom of the operator's cab body and the chassis frame to damp and restrict a vertical oscillation of the operator's cab body.

The connecting mechanism comprises first coupler levers longitudinally connected between the bottom of the operator's cab body and the chassis frame so as to restrict oscillation of the operator's cab body in the longitudinal direction thereof, a second coupler lever transversely connected between the bottom of the operator's cab body and the chassis frame so as to restrict oscillation of the operator's cab body in the transverse direction thereof, and/or a third coupler lever longitudinally connected between the top of the operator's cab body and an upstanding gate-shaped frame fixedly mounted on the chassis frame.

Further, both ends of each coupler lever are respectively connected through annular resilient members with connecting shafts, which are disposed perpendicularly to the coupler lever and one of which is fixedly secured through a bracket to the chassis frame and the other of which is fixedly secured through a bracket to the operator's cab body. As a result, oscillations of the operator's cab body caused by the vibrations can be also absorbed by these connecting arrangements. In addition, there is no sliding action between each coupler lever and each connecting shaft during operation of the vehicle.

Thus, the operator's cab of the present invention is adapted to be mounted on the vehicle body in a stable condition without tilting both in the longitudinal and the transverse directions, and moreover the support and suspension system therefor can be substantially maintenance-free without a need for applying lubrication.

BRIEF DESCRIPTION OF THE DRAWINGS

FIG. 4 is a fragmentary plan view of the upper portion of the operator's cab;

FIG. 5 is an enlarged vertical sectional view of an air spring;

FIG. 6 is a fragmentary sectional view of a first coupler lever;

FIG. 7 is a fragmentary sectional view of one end of a second coupler lever.

DETAILED DESCRIPTION OF THE INVENTION

Figure 1:
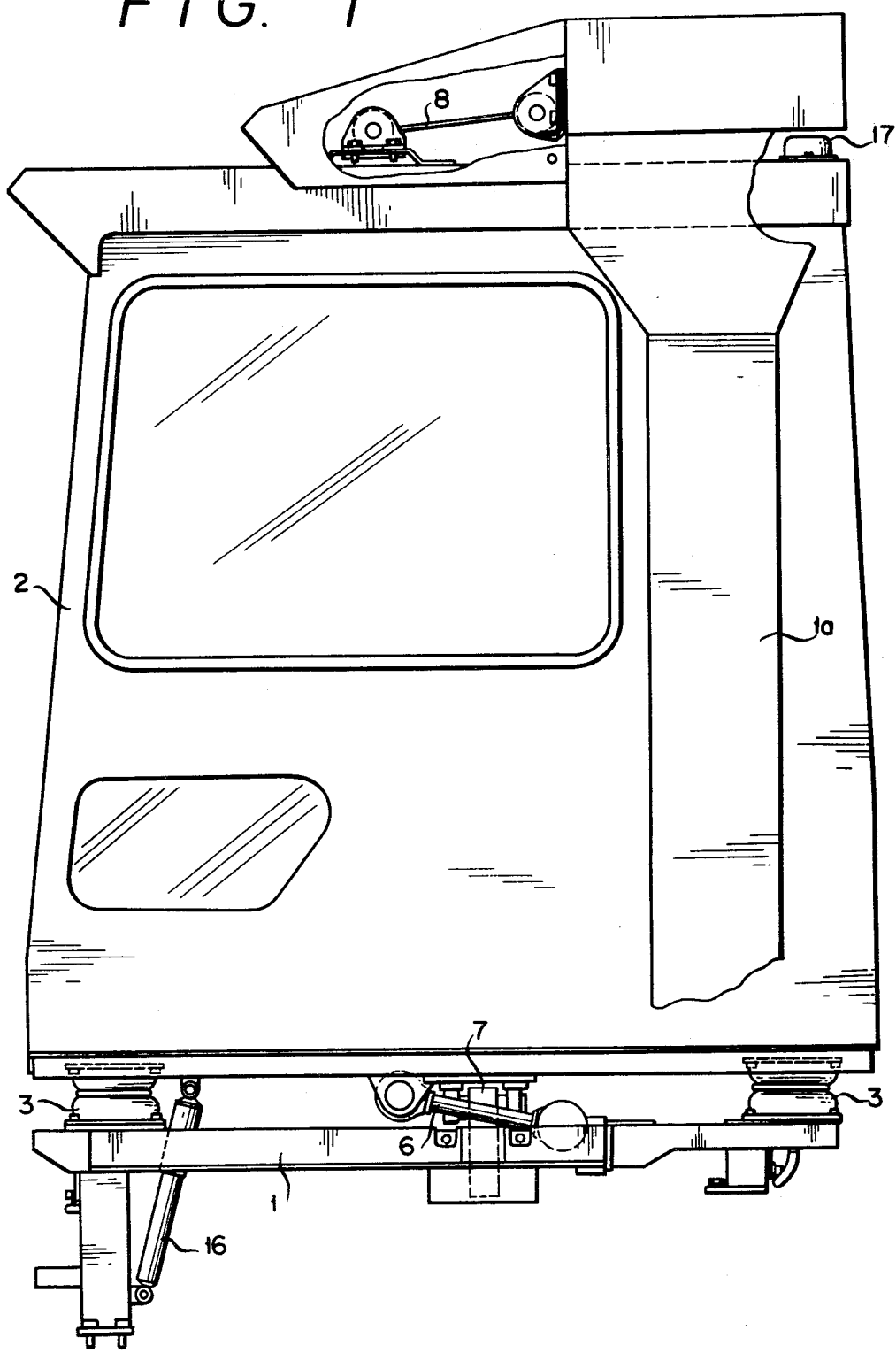
FIG. 1 is a fragmentary side elevational view of an operator's cab according to one embodiment of the present invention.
Figure 2:
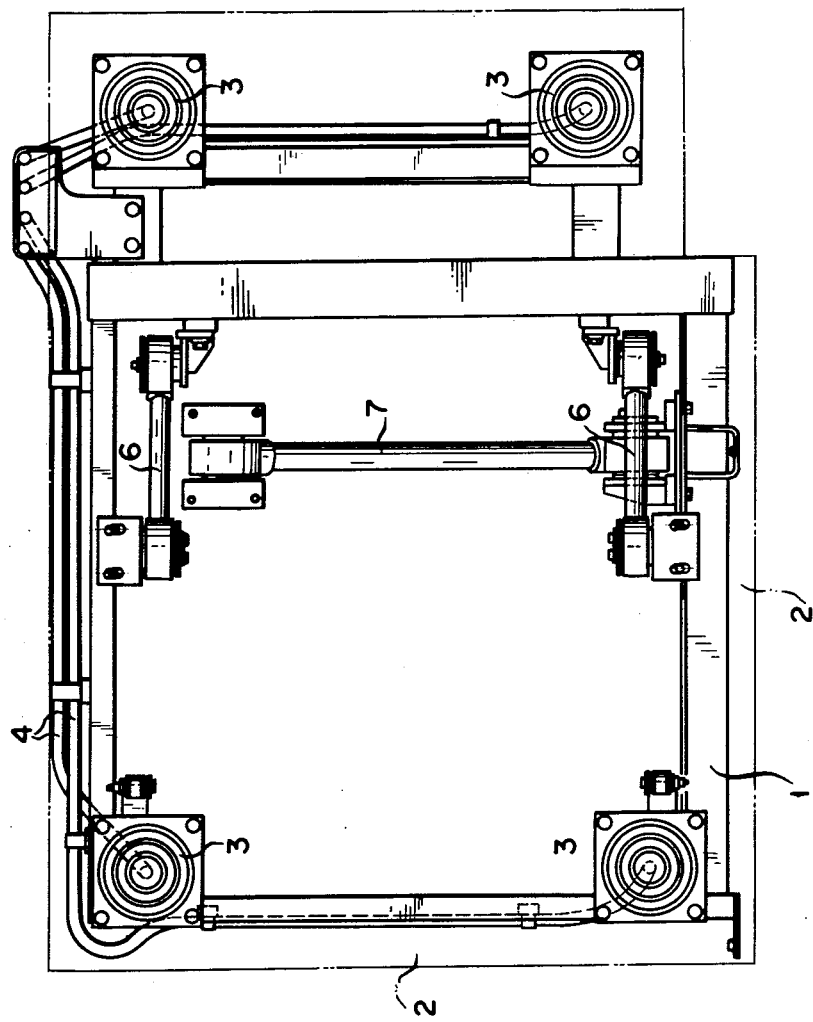
FIG. 2 is a fragmentary plan view of the lower portion of the operator's cab.
Figure 3:
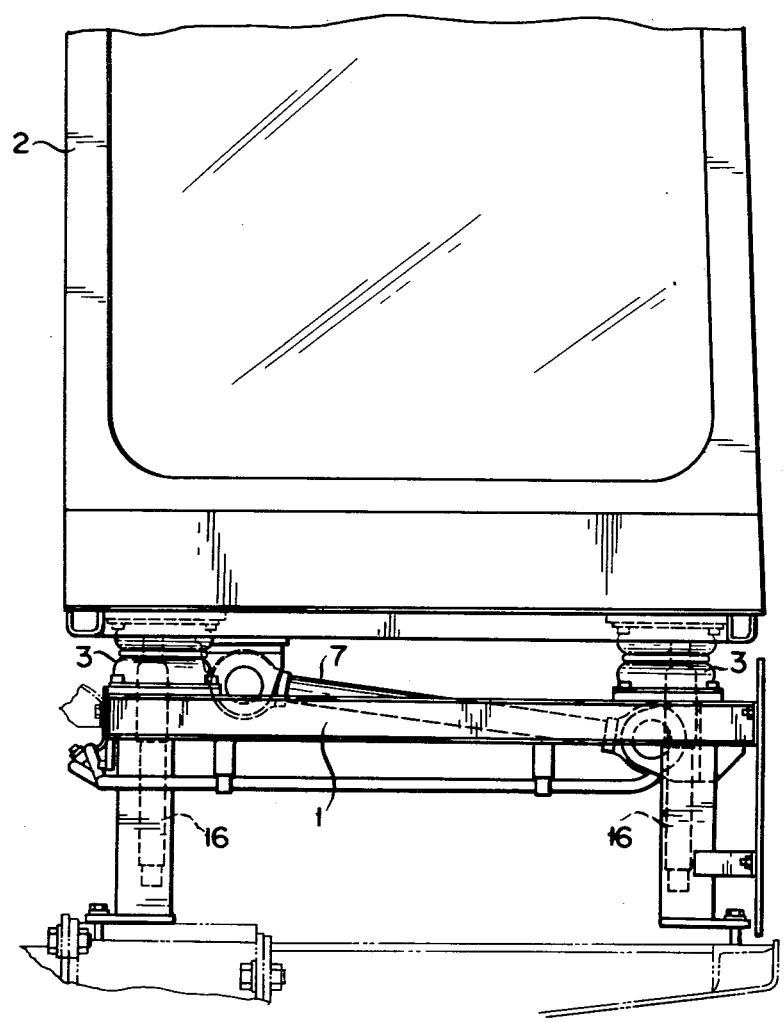
FIG. 3 is a fragmentary front view of the operator's cab.

The present invention will now be described in detail below by way of example only with reference to the accompanying drawings.

In the drawings, a chassis frame 1 constituting the vehicle body of a track-type vehicle has an operator's cab body 2 supported thereon through four sets of air springs 3. Each of the air springs 3 is connected through a pipe 4 to a pressurized air supply source (not shown). Each air spring comprises an annular elastic member having two openings, one of which is sealingly connected to the body and the other of which is sealingly connected to the frame. Further, each air spring 3 has mounted therein on the frame a stopper 5 of a resilient material which limits the amount of vertical flexing of the air spring to a distance "A" as shown in FIG. 5.

Figure 8:
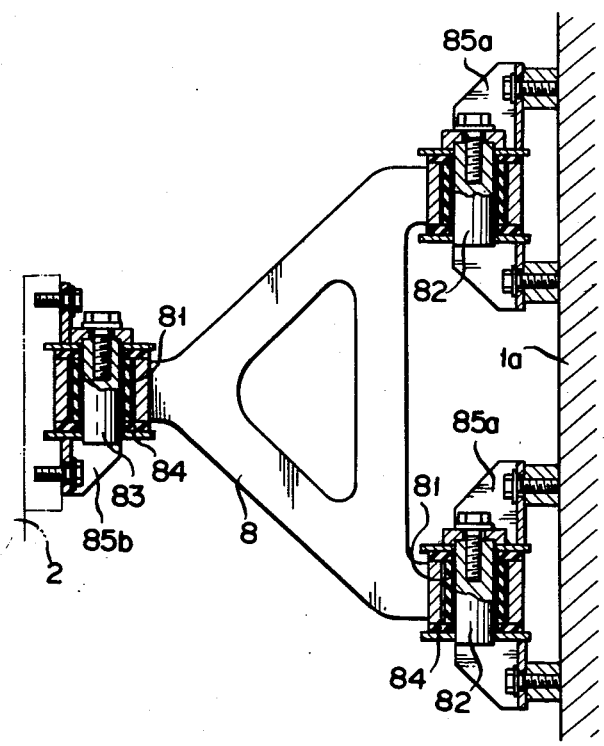
FIG. 8 is a fragmentary sectional view of both ends of a third coupler lever.

The chassis frame 1 and the bottom portion of the operator's cab body 2 are interconnected by first coupler levers 6, 6 which are located on the left and right hand sides of the operator's cab body to connect the chassis frame and the operator's cab body longitudinally and a second coupler lever 7 connecting the chassis frame and the operator's cab body transversely approximately at the position of center of gravity of the latter. Further, in the upper portion of the operator's cab body 2, there is provided a third coupler lever 8 which is carried by and extends from the chassis frame 1 as occasion demands to longitudinally connect the operator's cab body 2 to an upstanding gate-shaped frame 1a surrounding the operator's cab body 2 and fixedly mounted on the chassis frame 1. As shown in FIG. 6, the both ends of the first coupler lever 6 are connected through an annular resilient member 11 to shafts 9 and 10, respectively. The shafts 9 and 10 are fixedly secured through brackets 15a and 15b to the chassis frame 1 and the operator's cab body 2, respectively. Further, the brackets 15a and 15b supporting the aforementioned shafts 9 and 10, respectively, are each provided with a stopper plate 12 and a spacer 13 between which resilient thrust members 14 are interposed. Both ends of the second coupler lever 7 have nearly the same structure as the ends of the first coupler levers 6 as shown in FIG. 7. Further, as clearly shown in FIG. 8, the both ends of the third coupler lever 8 are each connected through an annular resilient member 81 and a thrust member 84 of an elastomer material to shafts 82 and a shaft 83, respectively. The shafts 82 and 83 are fixedly secured through brackets 85a and 85b to the gate-shaped frame 1a and the operator's cab body 2, respectively. Dampers 16 are connected at their opposite ends to the cab body 2 and the frame 1 to absorb the shock load and restrict vertical movement of the operator's cab body. Upper movement limit stoppers 17 are fixedly mounted on the top of the operator's cab body oppositely to the upstanding gate-shaped frame 1a.

The operator's cab body 2 is thus supported on the chassis frame through the air springs 3 in a vibration-proof manner against the vibration of the chassis frame 1. In this case, depending on the vibrating condition of the chassis frame 1, longitudinal and transverse oscillating forces are exerted on the operator's cab body 2. The longitudinal oscillating force is exerted on and held by the first coupler levers 6, 6 and/or the third coupler lever 8, whilst the transverse oscillating force is exerted on and held by the second coupler lever 7. Further, although the vertical movements of the operator's cab body 2 will oscillate all the levers vertically, such oscillation can be absorbed by the aforementioned plurality of resilient members.

Because, as already mentioned above, the respective two ends of the coupler levers 6, 7 and 8 are fixedly secured through the annular resilient members to the shafts mounted on the side of the chassis frame 1 or the gate-shaped frame 1a and the operator's cab body 2, the oscillatory displacements of the coupler levers 6, 7 and 8 caused by the vertical vibratory movements of the operator's cab body 2 relative to the chassis frame 1 or the gate-shaped frame 1a can be absorbed by the action of the aforementioned resilient members so that oscillations of the operator's cab body 2 may also be absorbed by these connecting arrangements. Further, even when the coupler levers are oscillated, it is not necessary to lubricate the end portions of them because they are not connected together as a slide fit. Therefore, they are maintenance-free without any need for applying lubrication.

Furthermore, when the operator's cab body 2 is pitching and rolling, the shock can be absorbed by the resilient members mounted at the connecting or joining portions of the first and second coupler levers 6, 7 and/or the third coupler lever 8 and also by the difference in the reaction forces of the air springs 3 installed at the four corners of the cab body 2 so that the longitudinal and transverse vibrations can be damped readily.

Further, the spring constant entire structure can be reduced as compared to general mechanical elastic bodies by using the air springs 3. In this manner, a high shock-absorbing effect can be obtained.

The vibration preventive action of an elastic body will now be mentioned below.

Stated in brief, the natural frequency of vibration of a mechanical system is determined by its weight and the spring constant of vibration-proof rubbers and can be represented by the following formula.

$$f_N = \frac{1}{2\pi} \sqrt{\frac{K}{W} \cdot g}$$

wherein K is the spring constant of the system, W is the weight thereof, g is acceleration of gravity and $f_N$ is the natural frequency of the system.

Whilst, if the number of vibrations caused by the mechanical system is represented by f, the frequency ratio U can be given by the following formula.

$$U = \frac{f}{f_N}$$

If the vibration transmission rate is represented by TR, the oscillatory force generated by the mechanical system by F, and the oscillatory force transmitted from the mechanical system to the foundation by $F_O$, the following relative equation can be obtained.

$$TR = \frac{F}{F_O} = \left| \frac{1}{1 - U^2} \right| \tag{1}$$

In this case, $U = \sqrt{2}$ and hence TR=1 so that the vibration preventive effect will become zero. In order to obtain a satisfactory vibration preventive effect, it is necessary to keep the value of TR less than 1, and the value of U is generally in the range of 2 to 3.

In brief, as can be seen from the above formula (1), as the value of $f_N$ become smaller, the value of U becomes larger, that is to say; the value of TR becomes smaller as the value of $f_N$ becomes smaller so that an increased vibration preventive effect can be obtained.

As can be seen from the foregoing, the reduction of the spring constant K of the system by using a plurality of air springs as in the case of the present invention will reduce the natural frequency of vibration of the system so that an improved shock absorbing effect can be obtained.

What is claimed is:

1. An operator's cab in a construction vehicle having a chassis frame comprising:
a body of the operator's cab having a bottom, a center of gravity, a location on the bottom horizontally corresponding to the center of gravity, and four diagonally opposed corners on the bottom;

air spring means provided between the bottom of the body and the chassis frame at each of the four corners for supporting the body on the frame in a cushioning manner;

two first coupler levers longitudinally connected between the bottom of the body and the frame restricting oscillation of the body in the longitudinal direction thereof;

a single second coupler lever transversely directly connected between a position near the location on the bottom of the body corresponding to the center of gravity and the frame restricting oscillation of the body in the transverse direction thereof; and damper means substantially vertically connected between the bottom of the body at two of the corners and the frame for damping and restricting vertical oscillation of the body;

both ends of each of the first coupler levers and the second coupler lever being respectively connected through annular resilient members with connecting shafts which are disposed perpendicularly to the coupler lever and one of which is fixedly secured through a bracket to the frame and the other of which is fixedly secured through a bracket to the body, thereby absorbing oscillations of the body into the annular resilient members.

2. An operator's cab as set forth in claim 1, further comprising a third coupler lever longitudinally connected between the top of the operator's cab body and an upstanding gate-shaped frame fixedly mounted on the chassis frame, and an upper limit stopper fixedly mounted on the top of the operator's cab body oppositely to the upstanding gate-shaped frame.

3. An operator's cab as set forth in claim 2, wherein both ends of the third coupler lever are respectively connected through annular resilient members with connecting shafts which are disposed perpendicularly to the coupler lever and one of which is fixedly secured through a bracket to the gate-shaped frame and the other of which is fixedly secured through a bracket to the top of operator's cab body, thereby absorbing oscillations of the operator's cab body into said annular resilient members.

4. An operator's cab as set forth in claim 1, wherein each air spring means comprises an annular elastic member having two openings, one of which is sealingly connected to the body and the other of which is sealingly connected to the frame; means supplying pressurized air to the interior of the elastic member; and a resilient stopper mounted inside of the elastic member on the frame limiting the amount of vertical flexing of the air spring means.

* * * * *